(12) United States Patent
Rapoport et al.

(10) Patent No.: US 9,882,750 B2
(45) Date of Patent: Jan. 30, 2018

(54) METHOD FOR RECOVERING A SPARSE COMMUNICATION SIGNAL FROM A RECEIVE SIGNAL

(71) Applicant: Huawei Technologies Co., Ltd., Shenzhen, Guangdong (CN)

(72) Inventors: Lev Borisovich Rapoport, Shenzhen (CN); Yanxing Zeng, Hangzhou (CN); Jianqiang Shen, Hangzhou (CN); Vladimir Iosifovich Ivanov, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 15/142,731

(22) Filed: Apr. 29, 2016

(65) Prior Publication Data

US 2016/0248611 A1    Aug. 25, 2016

Related U.S. Application Data

(63) Continuation of application No. PCT/RU2013/000974, filed on Nov. 1, 2013.

(51) Int. Cl.
*H03H 7/30* (2006.01)
*H03H 7/40* (2006.01)
(Continued)

(52) U.S. Cl.
CPC ....... *H04L 25/03987* (2013.01); *H04B 17/20* (2015.01)

(58) Field of Classification Search
CPC .................... H04L 25/03987; H04B 17/20
See application file for complete search history.

(56) References Cited

U.S. PATENT DOCUMENTS

2011/0090394 A1*  4/2011  Tian ................ H04N 19/63
                                                348/424.1
2012/0249353 A1* 10/2012  Khajehnejad ....... H03M 7/3062
                                                341/144
(Continued)

OTHER PUBLICATIONS

Sooraj K, Ambat, "Subspace Pursuit Bmbedded in Orthogonal Matchign Pursuit", Nov. 19, 2012.*

(Continued)

*Primary Examiner* — Chieh M Fan
*Assistant Examiner* — Sung Ahn (57) ABSTRACT

The patent application relates to a method for recovering a sparse communication signal from a receive signal, the receive signal being a channel output version of the sparse communication signal, the channel comprising channel coefficients being arranged to form a channel matrix, the method comprising determining a support set indicating a set of first indices of non-zero communication signal coefficients from the channel matrix and the receive signal, determining an estimate of the sparse communication signal upon the basis of the support set, the channel matrix and the receive signal, determining second indices of communication signal coefficients which are not indicated by the support set, and determining the sparse communication signal upon the basis of the support set, the estimate of the sparse communication signal, the second indices and the channel matrix.

21 Claims, 2 Drawing Sheets

(51) Int. Cl.
*H03K 5/159* (2006.01)
*H04L 25/03* (2006.01)
*H04B 17/20* (2015.01)

(56) References Cited

U.S. PATENT DOCUMENTS

| | | | |
|---|---|---|---|
| 2012/0259590 A1* | 10/2012 | Ye | H03M 7/3062 |
| | | | 702/189 |
| 2013/0036084 A1* | 2/2013 | Lee | G06N 5/00 |
| | | | 706/52 |
| 2013/0163645 A1* | 6/2013 | Kuo | H04B 7/0478 |
| | | | 375/219 |
| 2014/0086232 A1* | 3/2014 | Ling | H04L 25/0204 |
| | | | 370/346 |

OTHER PUBLICATIONS

Emmanuel J. Candes et al., "Decoding by Linear Programming", IEEE Transactions on Information Theory, vol. 51, No. 12, Dec. 2005, p. 4203-4215.

Emmanuel J. Candes et al., "Robust Uncertainty Principles: Exact Signal Reconstruction From Highly Incomplete Frequency Information", IEEE Transactions on Information Theory, vol. 52, No. 2, Feb. 2006, p. 489-509.

David L. Donoho, "Compressed Sensing", IEEE Transactions on Information Theory, vol. 52, No. 4, Apr. 2006, p. 1289-1306.

Meng Wang et al., "On the Performance of Sparse Recovery Via $\lambda p$-Minimization ($0 \leq p \geq 1$)", IEEE Transactions on Information Theory, vol. 57, No. 11, Nov. 2011, p. 7255-7278.

David L. Donoho et al., "Sparse Solution of Underdetermined Systems of Linear Equations by Stagewise Orthogonal Matching Pursuit", IEEE Transactions on Information Theory, vol. 58, No. 2, Feb. 2012, p. 1094-1121.

T. Tony Cai et al., "Orthogonal Matching Pursuit for Sparse Signal Recovery With Noise", IEEE Transactions on Information Theory, vol. 57, No. 7, Jul. 2011, p. 4680-4688.

Joel A. Tropp, "Greed is Good: Algorithmic Results for Sparse Approximation", IEEE Transactions on Information Theory, vol. 50, No. 10, Oct. 2004, p. 2231-2242.

M. Salman Asif et al., "Basis Pursuit with Sequential Measurements and Time Varying Signals", 2009 3rd IEEE International Workshop on Computational Advances in Multi-Sensor Adaptive Processing, 2009, p. 293-296.

Honglin Huang et al., "Backtracking-Based Matching Pursuit Method for Sparse Reconstruction", IEEE Signal Processing Letters, vol. 18, No. 7, Jul. 2011, p. 391-394.

Sooraj K. Ambat et al., "Subspace Pursuit Embedded in Orthogonal Matching Pursuit", Nov. 19, 2012, 5 pages.

Deepak Baby et al., "Ordered Orthogonal Matching Pursuit", IEEE, Feb. 3, 2012, 5 pages.

* cited by examiner

Fig. 2

METHOD FOR RECOVERING A SPARSE COMMUNICATION SIGNAL FROM A RECEIVE SIGNAL

CROSS-REFERENCE TO RELATED APPLICATIONS

This application is a continuation of International Application No. PCT/RU2013/000974, filed on Nov. 1, 2013, which is hereby incorporated by reference in its entirety.

TECHNICAL FIELD

The present patent application relates to the field of sparse signal recovery, in particular to performance and quality aspects.

BACKGROUND

Sparse signal recovery problems arise in many different applications. In communication systems, the recovery of sparse communication signals from receive signals is of increasing interest.

An n-dimensional communication signal or vector is called sparse if it comprises only a few non-zero entries among the total number of entries n. Sparse communication signals can be recovered from a fewer number of measurements comparing with the total dimension n. Sparseness can appear in different bases, so communication signals can, for example, be represented as sparse communication signals in time domain or in frequency domain.

The recovery of sparse communication signals is usually more computationally extensive than a matrix inverse or pseudo-inverse involved in least squares computations. Moreover, the matrix is usually not invertible, as the system is under-determined.

Common methods for sparse communication signal recovery suffer from high computational complexity and/or low performance. These methods are usually not suitable for use in real time systems.

In E. J. Candes, and T. Tao, "Decoding by linear programming," IEEE Trans. on Information Theory, vol. 51, no. 12, pp. 4203-4215, December 2005, a linear programming approach is proposed and analyzed.

In T. Cai, L. Wang, "Orthogonal Matching Pursuit for Sparse Signal Recovery With Noise," IEEE Trans. on Information Theory, v. 57, N. 7, pp. 4680-4688, the problem of sparse signal recovery from incomplete measurements is considered applying an orthogonal matching pursuit method.

SUMMARY

It is one object of the patent application to provide an efficient scheme for recovering a sparse communication signal from a receive signal.

This object is achieved by the features of the independent claims. Further implementation forms are apparent from the dependent claims, the description and the figures.

The patent application is based on the finding that an estimate of the sparse communication signal can be refined in order to determine the sparse communication signal.

According to a first aspect, the patent application relates to a method for recovering a sparse communication signal from a receive signal, the receive signal being a channel output version of the sparse communication signal, the channel comprising channel coefficients being arranged to form a channel matrix, the method comprising determining a support set indicating a set of first indices of non-zero communication signal coefficients from the channel matrix and the receive signal, determining an estimate of the sparse communication signal upon the basis of the support set, the channel matrix and the receive signal, determining second indices of communication signal coefficients which are not indicated by the support set, and determining the sparse communication signal upon the basis of the support set, the estimate of the sparse communication signal, the second indices and the channel matrix. Thus, the sparse communication signal can be recovered efficiently.

The sparse communication signal can be represented by a vector. The sparse communication signal can comprise communication signal coefficients. The communication signal coefficients can be real numbers, e.g., 1.5 or 2.3, or complex numbers, e.g., 1+j or 5+3j.

The receive signal can be represented by a vector. The receive signal can comprise receive signal coefficients. The receive signal coefficients can be real numbers, e.g., 1.3 or 2.7, or complex numbers, e.g., 2+3j or 1-5j.

The channel can define a linear relationship between the sparse communication signal and the receive signal. The channel can comprise additive noise. The channel coefficients can be real numbers, e.g., 0.3 or 1.5, or complex numbers, e.g., 3-2j or 1+4j.

The support set can indicate a set of indices of non-zero communication signal coefficients.

In a first implementation form according to the first aspect as such, the method further comprises updating the support set upon the basis of the second indices of communication signal coefficients. Thus, the support set can be refined for further processing.

The updating of the support set can relate to adding second indices of communication signal coefficients to the support set, or subtracting second indices of communication signal coefficients from the support set.

In a second implementation form according to the first aspect as such or the first implementation form of the first aspect, the method further comprises determining a cardinality of the support set or the updated support set, the cardinality indicating a number of elements of the support set or the updated support set. Thus, a sparsity measure for the sparse communication signal can be derived.

In a third implementation form according to the first aspect as such or any one of the preceding implementation forms of the first aspect, the sparse communication signal comprises communication signal coefficients and the receive signal comprises receive signal coefficients, and the number of communication signal coefficients is greater than the number of receive signal coefficients. Thus, a reduced number of receive signal coefficients can be used for performing the method.

In a fourth implementation form according to the first aspect as such or any one of the preceding implementation forms of the first aspect, the determining of the support set or the determining of the estimate of the sparse communication signal is performed by an orthogonal matching pursuit method. Thus, an efficient method for determining the support set and/or determining the estimate of the sparse communication signal can be applied.

The orthogonal matching pursuit method can be adapted to optimize a linear objective function, subject to linear equality constraints and/or linear inequality constraints. An orthogonal matching pursuit method is described e.g. in T. Cai, L. Wang, "Orthogonal Matching Pursuit for Sparse Signal Recovery With Noise," IEEE Trans. on Information Theory, v. 57, N. 7, pp. 4680-4688.

In a fifth implementation form according to the first aspect as such or any one of the preceding implementation forms of the first aspect, the determining of second indices of communication signal coefficients comprises minimizing a residual of a dual linear programming problem, and the dual linear programming problem is defined by the following equations:

$$-e \leq H^T z \leq e,$$

$$y^T z \rightarrow \min,$$

wherein H denotes the channel matrix, y denotes the receive signal, e denotes an all unit vector, and z denotes a dual variable. Thus, the second indices of communication signal coefficients can be determined in an optimized manner.

In a sixth implementation form according to the first aspect as such or any one of the preceding implementation forms of the first aspect, the determining of second indices of communication signal coefficients comprises minimizing a residual of a dual linear programming problem, and the residual is defined by:

$$\Delta_{S^*,j}^+ = 1 + H_j^T z_{S^*} \text{ or } \Delta_{S^*,j}^- = 1 - H_j^T z_{S^*}$$

$$\text{with } z_{S^*} = -H_{S^*}(H_{S^*}^T H_{S^*})^{-1} e_{S^*},$$

$$e_{S^*} = (e_{S^*,1}, e_{S^*,2}, \ldots, e_{S^*,l^*})^T,$$

$$e_{S^*,i} = 1 \text{ if } i \in S^*_+,$$

$$e_{S^*,i} = -1 \text{ if } i \in S^*_-, \text{ and}$$

$$S^* = S^*_+ \cup S^*_-,$$

wherein S* denotes the support set being divided into two subsets according to signs of the entries of the vector $x_{S^*} = (H_{S^*}^T H_{S^*})^{-1} H_{S^*}^T y$, $S^*_+$ denotes a subset of the support set S* corresponding to the positive entries of $x_{S^*}$, $S^*_-$ denotes a subset of the support set S* corresponding to the negative entries of $x_{S^*}$, $e_{S^*}$ denotes an auxiliary vector, $e_{S^*,i}$ denote coefficients of the auxiliary vector $e_{S^*}$ with index i, $H_{S^*}$ denotes a channel matrix comprising columns indicated by the support set S*, $z_{S^*}$ denotes an estimate solution of a dual linear programming problem, $H_j$ denotes a channel matrix comprising a column indicated by index j, and $\Delta_{S^*,j}^+$ or $\Delta_{S^*,j}^-$ denote the residual. Thus, the second indices of communication signal coefficients can be determined in an optimized manner.

In a seventh implementation form according to the first aspect as such or any one of the preceding implementation forms of the first aspect, the determining of second indices of communication signal coefficients comprises minimizing a residual of a dual linear programming problem, and the determining of second indices of communication signal coefficients is performed according to the following equations:

$$j^{(1)} = \operatorname*{argmin}_j \Delta_{S^*,j}^+ \text{ or } j^{(1)} = \operatorname*{argmin}_j \Delta_{S^*,j}^-,$$

wherein $\Delta_{S^*,j}^+$ or $\Delta_{S^*,j}^-$ denote a residual of a dual linear programming problem, and $j^{(1)}$ denotes the second indices of communication signal coefficients. Thus, the second indices of communication signal coefficients can be determined in an optimized manner.

In an eighth implementation form according to the first aspect as such or any one of the preceding implementation forms of the first aspect, the determining of the sparse communication signal is performed according to the following equation:

$$x_{S^{(1)}} = x_{S^*} - \alpha (H_{S^*}^T H_{S^*})^{-1} H_{S^*}^T H_{j^{(1)}}, \alpha > 0$$

wherein $H_{S^*}$ denotes a channel matrix comprising columns indicated by the support set S*, $H_{j^{(1)}}$ denotes a channel matrix comprising columns indicated by second indices of communication signal coefficients $j^{(1)}$, $\alpha$ denotes a predetermined value, $x_{S^*}$ denotes an estimate of the sparse communication signal, and $x_{S^{(1)}}$ denotes the sparse communication signal. Thus, the sparse communication signal can be determined efficiently.

The predetermined value $\alpha$ can be a real number, e.g. 0.2, or a complex number, e.g. 1+j.

In a ninth implementation form according to the first implementation form of the first aspect, the updating of the support set is performed according to the following equation:

$$S^{(1)} = S^* \cup \{j^{(1)}\} \setminus \{j_i^{(1)}\},$$

wherein $j^{(1)}$ denotes second indices of communication signal coefficients, $j_i^{(1)}$ denotes indices of communication signal coefficients to be removed from the support set, $i^{(1)}$ denotes a number of an entry to be removed from the support set, S* denotes the support set, and $S^{(1)}$ denotes the updated support set. Thus, the support set can be refined in an optimized manner.

In a tenth implementation form according to the first aspect as such or any one of the preceding implementation forms of the first aspect, the determining of the support set, the determining of the estimate of the sparse communication signal, the determining of the second indices of communication signal coefficients, the determining of the sparse communication signal, the updating of the support set, and the determining of the cardinality are successively repeated until a stopping criterion is met. Thus, the performance of the method can be improved.

In an eleventh implementation form according to the tenth implementation form of the first aspect, the sparse communication signal corresponding to the support set with least cardinality is provided as the recovered sparse communication signal. Thus, the sparsity of the recovered sparse communication signal can be optimized.

In a twelfth implementation form according to the tenth implementation form of the first aspect or the eleventh implementation form of the first aspect, the stopping criterion is a positive value or a zero value of all residuals of a dual linear programming problem, and a residual is defined by:

$$\Delta_{S^*,j}^+ = 1 + H_j^T z_{S^*} \text{ or } \Delta_{S^*,j}^- = 1 - H_j^T z_{S^*}$$

$$\text{with } z_{S^*} = -H_{S^*}(H_{S^*}^T H_{S^*})^{-1} e_{S^*},$$

$$e_{S^*} = (e_{S^*,1}, e_{S^*,2}, \ldots, e_{S^*,l^*})^T,$$

$$e_{S^*,i} = 1 \text{ if } i \in S^*_+,$$

$$e_{S^*,i} = -1 \text{ if } i \in S^*_-, \text{ and}$$

$$S^* = S^*_+ \cup S^*_-,$$

wherein S* denotes the support set being divided into two subsets according to signs of the entries of the vector $x_{S^*} = (H_{S^*}^T H_{S^*})^{-1} H_{S^*}^T y$, $S^*_+$ denotes a subset of the support set S* corresponding to the positive entries of $x_{S^*}$, $S^*_-$ denotes a subset of the support set $S^*$ corresponding to the negative entries of $x_{S^*}$, $e_{S^*}$ denotes an auxiliary vector, $e_{S^*,i}$ denote coefficients of the auxiliary vector $e_{S^*}$ with index i, $H_{S^*}$ denotes a channel matrix comprising columns indicated by the support set $S^*$, $z_{S^*}$ denotes an estimate solution of a dual linear programming problem, $H_j$ denotes a channel matrix comprising a column indicated by index j, and $\Delta_{S^*,j}^+$ or $\Delta_{S^*,j}^-$ the residual. Thus, the stopping criterion can be based on a performance criterion.

In a thirteenth implementation form according to the tenth implementation form of the first aspect to the twelfth implementation form of the first aspect, the stopping criterion is an expiry of a length of a predetermined time interval. Thus, the stopping criterion enables an application of the method in real time systems.

The length of the predetermined time interval can be e.g., 1 ms, 5 ms, or 10 ms.

According to a second aspect, the patent application relates to a computer program for performing the method according to the first aspect as such or any one of the preceding implementation forms of the first aspect when executed on a computer. Thus, the method can be performed in an automatic and repeatable manner.

The computer program can be provided in form of a machine-readable code. The computer program can comprise a series of commands for a processor of the computer.

The computer can comprise a processor, a memory, an input interface, and/or an output interface. The processor of the computer can be configured to execute the computer program.

The patent application can be implemented in hardware and/or software.

BRIEF DESCRIPTION OF THE DRAWINGS

Further embodiments of the patent application will be described with respect to the following figures, in which.

DETAILED DESCRIPTION

Figure 1:
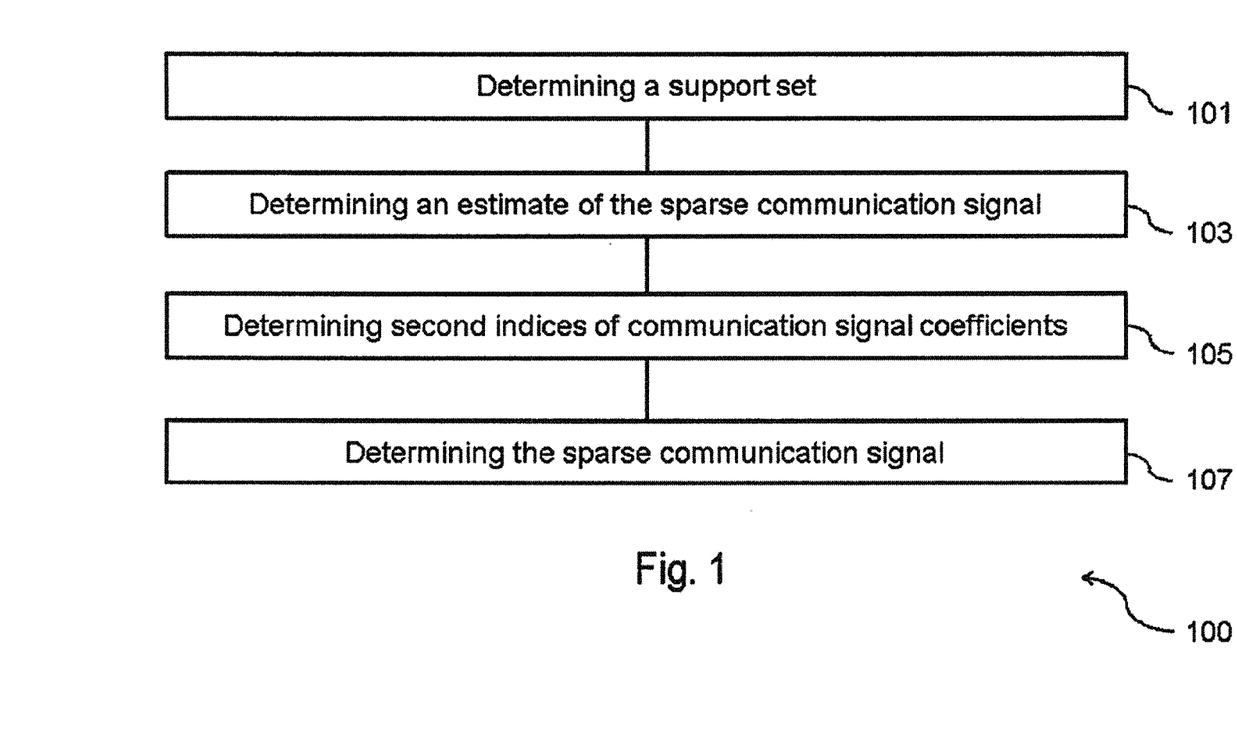
FIG. 1 shows a schematic diagram of a method for recovering a sparse communication signal from a receive signal.

FIG. 1 shows a schematic diagram of a method 100 for recovering a sparse communication signal from a receive signal.

The receive signal is a channel output version of the sparse communication signal. The channel comprises channel coefficients being arranged to form a channel matrix.

The method 100 comprises determining 101 a support set indicating a set of first indices of non-zero communication signal coefficients from the channel matrix and the receive signal, determining 103 an estimate of the sparse communication signal upon the basis of the support set, the channel matrix and the receive signal, determining 105 second indices of communication signal coefficients which are not indicated by the support set, and determining 107 the sparse communication signal upon the basis of the support set, the estimate of the sparse communication signal, the second indices and the channel matrix.

The sparse communication signal can be represented by a vector. The sparse communication signal can comprise communication signal coefficients. The communication signal coefficients can be real numbers, e.g., 1.5 or 2.3, or complex numbers, e.g., 1+j or 5+3j.

The receive signal can be represented by a vector. The receive signal can comprise receive signal coefficients. The receive signal coefficients can be real numbers, e.g., 1.3 or 2.7, or complex numbers, e.g., 2+3j or 1−5j.

The channel can define a linear relationship between the sparse communication signal and the receive signal. The channel can comprise additive noise. The channel coefficients can be real numbers, e.g., 0.3 or 1.5, or complex numbers, e.g., 3−2j or 1+4j.

The support set can indicate a set of indices of non-zero communication signal coefficients.

Figure 2:
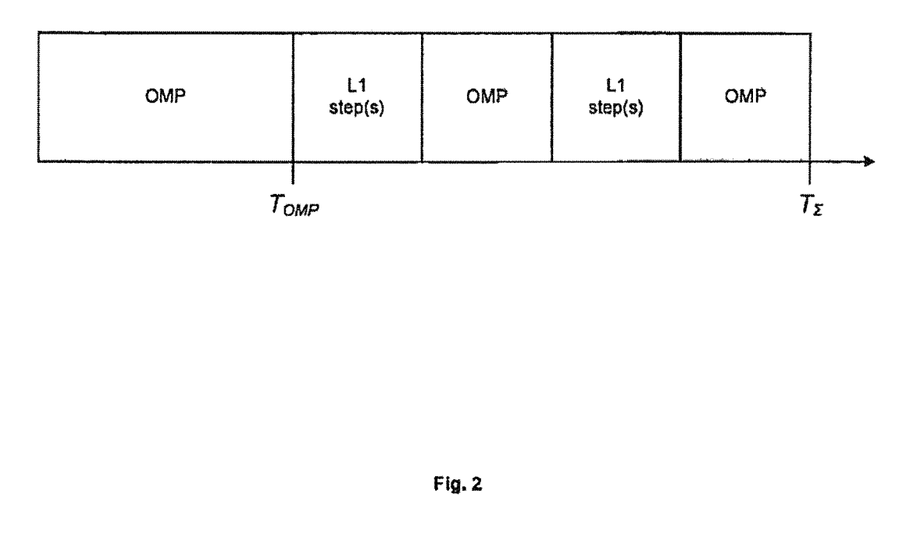
FIG. 2 shows a schematic diagram of a time slot allocated for recovering a sparse communication signal from a receive signal.

FIG. 2 shows a schematic diagram of a time slot allocated for recovering a sparse communication signal from a receive signal.

The problem of sparse signals recovery from incomplete measurements can be solved using OMP method and its modifications. Further, there are linear programming approaches LP. However, there are no attempts to combine the OMP and LP into the one numerical scheme.

The n-dimensional vector 0 is called sparse if it has only few non-zero entries among total number n. Sparse compressible vectors can be restored from the fewer number of measurements comparing with total dimension n. Sparseness can appear in different bases, so signals can be represented as sparse vectors in time domain or in frequency domain.

Reconstruction of sparse signals is normally more computationally extensive than just measurement matrix inverse or pseudo-inverse involved in the least squares computations. Moreover, the measurement matrix is usually not invertible, as the system is underdetermined.

Numerically efficient reconstruction algorithms should be suitable for use in real time. The linear system $$Hx=y, \qquad (1)$$

where $H \in R^{m \times n}$, $x \in R^n$, $y \in R^m$ is under-determined if m<n. More precisely, the system (1) is under-determined if rank (H)<n. This kind of systems has infinitely many solutions. The pattern of the system can be schematically represented as described with the following matrix-vector pattern:

$$\begin{bmatrix} \cdots \\ \cdots \\ \cdots \end{bmatrix} \times \begin{bmatrix} \cdot \\ \cdot \\ \cdot \\ \cdot \\ \cdot \\ \cdot \end{bmatrix} = \begin{bmatrix} \cdot \\ \cdot \\ \cdot \end{bmatrix}$$

The trade-off for reducing the number of measurements is sparseness of the vectors x. Sparseness means that zeros dominate among the entries of the vector x. The methods of search for most sparse solutions among solutions of the system (1) are the key problem considered in the compressive sensing (CS) theory.

The key problem considered in the (CS) theory can be reformulated as reconstruction of the correct support set, corresponding to the most sparse vector, i.e. the set of significant non-zero entries:

$$\mathrm{Supp}(x) = \{i : x_i \neq 0\}.$$

It has been shown that while $$\|x\|_0 \to \min,$$

$$Hx=y, \qquad (P_0)$$

is the correct formulation of the problem for determination of the most sparse solution, where $\|x\|_0$=Supp(x), the relaxed form of this problem $$\|x\|_p \to \min,$$

$$Hx=y, \qquad (P_p)$$

is also sufficient, where $$\|x\|_p = \left(\sum_{i=1}^{n} |x|_i^p\right)^{\frac{1}{p}}$$

is the $l_p$-norm of the vector, p>0. Non-convex nature of this problem makes it hard for numerical solution. One of the popular methods for determination of the sparsest solution, i.e. solution having largest number of zero entries, consists in solution of the problem ($P_1$) which is linear programming problem (LP):

$$\|x\|_1 \to \min,$$

$$Hx=y, \qquad (P_1), (LP)$$

where $\|x\|_1$ is the $l_1$-norm of the vector, $$\|x\|_1 = \sum_{i=1}^{n} |x_i|.$$

That is one of the standard methods exploited in the Compressive Sensing (CS) theory.

Its advantages are convexity and applicability of all known convex optimization methods, including linear programming methods such as the simplex method and good performance if compared with the best possible, but NP-hard solution of the problem ($P_0$).

A more efficient solution for real time implementation is the Orthogonal Matching Pursuit (OMP) algorithm. Its key idea is formulated as follows.

Step 0: Initialize the residual $r^{(0)}$=y, and initialize the estimate of the support set $S^{(0)}$=∅.

Step k=1,2, . . . . Find the column $H_{j^{(k)}}$ of the matrix H that solves the problem $$j^{(k)} = \underset{j}{\mathrm{argmax}} \frac{|H_j^T r^{(k-1)}|}{\|H_j\|},$$

and update $S^{(k)}$=$S^{(k-1)}\cup\{j^{(k)}\}$, $r^{(k)}$=$H_{S^{(k)}}x^{(k)}$−y, where $H_{S^{(k)}}$ is the sub-matrix of H consisting of those $H_j$, with indices j∈$S^{(k)}$. Steps are repeated until stopping criterion is satisfied $$r^{(k)T}r^{(k)} \leq \sigma^2. \qquad (SC)$$

That is a kind of so-called greedy algorithms, the index included into the support set is not taken out of the set. The advantage of this OMP algorithm is its high computational complexity if compared with other methods. The OMP algorithm shows lower performance results when reconstructing the sparse signal if compared with results obtained by ($P_1$).

The mentioned problem can be solved by combining the OMP method and linear programming method ($P_1$) into one numerical algorithm.

A structure of the time slot allocated to the problem solution is shown in FIG. 2. Let the time slot allocated to the sparse recovery problem be $T_\Sigma$ and OMP iterations take $T_{OMP}$ which is less than $T_\Sigma$ as shown. So, we have time $T_\Sigma$-$T_{OMP}$ for improvements considering the OMP solution as an initial step.

Terminating the process immediately after the time slot $T_\Sigma$ is exhausted, as much as possible is gained compared with conventional OMP making improvements between $T_{OMP}$ and $T_\Sigma$.

Consider the LP problem induced by the $l_1$ minimization that can be equivalently represented as $$Hu-Hv=y, u\geq 0, v\geq 0,$$

$$e^T u + e^T v \to \min, \qquad (PLP)$$

where e is the vector consisting of all units, having appropriate size. Here x=u−v.

This linear programming problem will be referred to as the primary LP (PLP). Along with (PLP) consider the dual linear programming problem (DLP):

$$-e \leq H^T z \leq e,$$

$$y^T z \to \min, \qquad (DLP)$$

where z stands for dual variable.

Suppose that OMP has completed resulting in:

S*−the last estimate of the support set obtained by OMP, l*=card(S*)

$$H_{S*} \in R^{m \times l^*},$$

$$x_{S*} = (H_{S*}^T H_{S*})^{-1} H_{S*}^T y \in R^{l^*}.$$

The set S* can be further divided into two subsets according to signs of the entries of the vector $x_{S*}$:

$$S^* = S^*_+ \cup S^*_-$$

Let define:

$$e_{S*} = (e_{S*,1}, e_{S*,2}, \ldots, e_{S*,l^*})^T,$$

$$e_{S*,i} = 1 \text{ if } i \in S^*_+,$$

$$e_{S*,i} = -1 \text{ if } i \in S^*_-.$$

Generally it is l*≤m and so, the matrix $H_{S*}$ is not square.

The current estimate of the DLP solution, corresponding to the basis S*, can be calculated as the minimum norm solution to the under-determined system $$H_{S*}^T z = -e_{S*}, \|z\|_2^2 \to \min,$$

which has the closed form solution $$z_{S*} = -H_{S*}(H_{S*}^T H_{S*})^{-1} e_{S*} \qquad (2)$$

This vector corresponds to the problem (DLP) that it can be either feasible or not feasible to the system of linear inequalities. It can be either optimal or not optimal to (DLP). Optimality conditions hold, as the set S* is obtained at the last step of the first stage (OMP). So, feasibility conditions of the vector x* obtained at the last iteration of OMP are 'almost satisfied' due to (SC). But (PLP) is dual to (DLP) and feasibility conditions for (PLP) are optimality conditions to (DLP).

So, only feasibility conditions of the vector $z_{S^*}$ are checked. Check residuals of (DLP) for inequalities $j \notin J_{S^*}$ to see if there are violated conditions or, what is the same, residuals with incorrect sign.

Residuals of (DLP) are $$\Delta_{S^*,j}^+ = 1 + H_j^T z_{S^*},$$

$$\Delta_{S^*,j}^- = 1 - H_j^T z_{S^*}. \quad (3)$$

Both $\Delta_{S^*,j}^+$ and $\Delta_{S^*,j}^-$ can be non-negative for all j. If this condition is satisfied, both (PLP) and (DLP) are solved with solutions $x_{S^*}$ and $z_{S^*}$ respectively. Let one of the residuals be negative. Without loss of generality, let $$j^{(1)} = \operatorname*{argmin}_j \Delta_{S^*,j}^+ \quad (4)$$

and $$\Delta_{S^*,j^{(1)}}^+ < 0. \quad (5)$$

Then a new solution $$x_{S^{(1)}} = x_{S^*} - \alpha (H_{S^*}^T H_{S^*})^{-1} H_{S^*}^T H_{j^{(1)}}, \alpha > 0 \quad (6)$$

can be generated with the following $l_1$ improvement property:

$$\|x_{S^{(1)}}\|_1 < \|x_{S^*}\|_1,$$

$$S^{(1)} = S^* \cup \{j^{(1)}\} \setminus \{i_{i^{(1)}}\}, \quad (7)$$

$i^{(1)}$ is the number of the entry to be removed from the basis (the serial number in the series 1,2, . . . , l*).

The Enhanced OMP algorithm can be summarized as follows:

---
1) k = 0;
while(allocated time slot is not exhausted)
{
  1) perform OMP (or any of its modifications, 10);
  2) Start an $l_1$ improvement step: performing calculations according to (2)-(4);
  3) Check if the condition (5) is satisfied. If not, terminate the algorithm as
    (DLP) is feasible and so, (PLP) has an optimal solution. Otherwise, perform
    next step;
  4) correct set of 'active' indices and recalculate the solution according to (6),
    (7); The index removed from the basis is not inserted back, so the
    modification (7) is 'greedy';
  5) Keep the record value of card($S^{(k)}$) (or $l_1$-norm): solution corresponding to
    the least cardinality (or least $l_1$) is recorded to be reported as a result;
  6) k := k + 1
}
---

An n-dimensional vector x is sparse if it has only few non-zero entries among total number n.

A sparse compressible vector can be restored from fewer number of measurements comparing with total dimension n. Sparseness can appear in different bases, so signals can be represented as sparse vectors in time domain or in frequency domain.

Reconstruction of sparse signals is normally more computationally extensive than just measurement matrix inverse. Moreover, the measurement matrix is usually not invertible, as the system is underdetermined.

It is desirable for numerically efficient reconstruction algorithms to be suitable for use in real time.

Recovery of sparse signals from under-determined or incomplete measurement model is can be performed. The linear system $$Hx=y$$

where $H \in R^{m \times n}, y \in R^m, x \in R^n$ and m<n is under-determined. Having the pattern $$\begin{bmatrix} \cdots \cdots \\ \cdots \cdots \\ \cdots \cdots \end{bmatrix} \times \begin{bmatrix} \cdot \\ \cdot \\ \cdot \\ \cdot \\ \cdot \\ \cdot \end{bmatrix} = \begin{bmatrix} \cdot \\ \cdot \\ \cdot \end{bmatrix}$$

it has infinitely many solutions: Null(H)+$x_0$ is a set of solutions together with every single solution $x_0$. To find the sparsest solution, i.e. solution having largest number of zero entries, can be found as $l_1$ minimizer:

$$\|x\|_1 \to \min \text{ subjected to constraints } Hx=y$$

which is a linear program (LP). That is standard problem setup exploited in the Compressive Sensing (CS) theory.

LP is computationally extensive. Much easier for real time implementation is the Orthogonal Matching Pursuit (OMP) algorithm. Its key idea is formulated as follows.

Step 0: Initialize the residual $r_0 = y$ and estimate of the support set $S_0 = \emptyset$.

Step k=1, . . . : Find the column $H_{j_k}$ of the matrix H that solves the problem $$j_k = \operatorname*{argmax}_j \left| \frac{H_j^T r_{k-1}}{\|H_j\|} \right|$$

and update $S_k = S_{k-1} \cup \{j_k\}$, $r_k = y - Hx_k$, where $x_k = (H_{S_k}^T H_{S_k})^{-1} H_{S_k}^T y$, $H_{S_k}$ denotes submatrix of the matrix H corresponding to the set of indices $s_k$.

Steps are repeated until stopping criterion is satisfied.

Suppose the measurement model is described by the equation $y = Hx + \epsilon$, $x \in R^n$, $y \in R^m$ with number of measurements m significantly less than the length of the binary word x.

Suppose that not more than k entries of the vector x are non-zero. In other words n, $$x_i = 0 \text{ for } i \notin \operatorname{supp}(x), x_i \neq 0 \text{ for } i \in \operatorname{supp}(x),$$
$$\operatorname{card}(\operatorname{supp}(x)) = k.$$

Moreover, the matrix H satisfies the Restricted Isometry Property (RIP) property and the following conditions hold $$m \sim k \log\left(\frac{n}{k}\right), E(\epsilon^T \epsilon) = \sigma^2.$$

Stopping criterion for OMP can be chosen like $$r_k^T r_k \leq \sigma^2. \quad (SC)$$

The key idea is to combine advantages of OMP and LP approaches, considering OMP as a first stage of the Enhanced OMP (EOMP), and making several iterations of modified simplex method after (SC) is met, considering $S_k$ as an initial basis, attempting to sequentially modify its content.

The combined algorithm is greedy: the basis is only extended at the first OMP stage; the index removed from the basis at the second stage is not inserted again. Matrix pseudoinverse is modified using low rank modifications of matrix factorizations when performing the second stage.

Consider the LP problem induced by the $l_1$ minimization. It can be equivalently represented as $$Hu-Hv=y, u \geq 0, v \geq 0,$$

$$e^T u + e^T v \to \min \quad (PLP)$$

where e is the vector consisting of all units, having appropriate size. Here x=u−v. This LP will be referred to as the Primary LP (PLP). Along with (PLP) consider the Dual LP (DLP)

$$-e \leq H^T z \leq e,$$

$$y^T z \to \min \quad (DLP)$$

where z stands for dual variable.
Suppose that OMP has completed resulting in:

$S^*$—the last estimate of the support set obtained by OMP,$l^* = \text{card}(S^*)$ $H_{S^*} \in R^{m \times l^*}$, $x_{S^*} = (H_{S^*}^T H_{S^*})^{-1} H_{S^*}^T y \in R^{l^*}$.

The set $S^*$ can be further divided into two subsets according to signs of the entries of the vector $x_{S^*}$.

$S^* = S^*_+ \cup S^*_-$

Let define $e_{S^*} = (e_{S^*,1}, e_{S^*,2}, \ldots, e_{S^*,l^*})^T$, $e_{S^*,i} = 1$ if $i \in S^*_+$, $e_{S^*,i} = -1$ if $i \in S^*_-$.

The current estimate of the DLP solution, corresponding to the basis $S^*$, can be calculated as the minimum norm solution to the under-determined system $$H_{S^*} z = -e_{S^*}, \|z\|^2 \to \min,$$

which has the closed form solution $$z_{S^*} = -H_{S^*}(H_{S^*}^T H_{S^*})^{-1} e_{S^*}.$$

This vector corresponds to the problem (DLP) in that it can be either feasible or not feasible to the system of linear inequalities. It can be either optimal or not optimal to (DLP).

Optimality conditions hold, as the set $S^*$ is obtained at the last step of the first stage (OMP). So, feasibility conditions are 'almost satisfied' due to (SC). But (PLP) is dual to (DLP) and feasibility conditions for (PLP) are optimality conditions to (DLP). So, only feasibility conditions can be checked.

Let $J_{S^*}$ be the set of columns indices of the matrix corresponding to the basis $S^*$. Check residuals of (DLP) for inequalities $j \notin J_{S^*}$.
Residuals of (DLP) are $$\Delta_{S^*,j}^+ = 1 + H_j^T z_{S^*},$$

$$\Delta_{S^*,j}^- = 1 - H_j^T z_{S^*}.$$

Both $\Delta_{S^*,j}^+$ and $\Delta_{S^*,j}^-$ can be non-negative. If so both (PLP) and (DLP) are solved with solutions $x_{S^*}$ and $z_{S^*}$ respectively. Let one of residuals be negative. Without loss of generality, let $\Delta_{S^*,j^{(1)}}^+ < 0$. Then new solution $$x_{S^{(1)}} = x_{S^*} - \alpha (H_{S^*}^T H_{S^*})^{-1} H_{S^*}^T H_{j^{(1)}}, \alpha > 0$$

can be generated with the following $l_1$ improvement property:

$|x_{S^{(1)}}| < |x_{S^*}|$, $S^{(1)} = S^* \cup \{j^{(1)}\} \setminus \{j_i^{(1)}\}$ $i^{(1)}$ is the number of the entry to be removed from the basis.
Finally, the algorithm can be summarized as follows:

```
while(DLP constraints are violated and number of iterations did
not exceed a limit)
{
    perform OMP;
    make an l₁ improvement step;
    correct set of 'active' indexes: index removed from the
    basis is not inserted back;
    keep record value of card(S^(l)): solution corresponding to the
    least cardinality is    reported.
}
```

In an implementation form, the patent application relates to an enhanced orthogonal matching pursuit for sparse signal recovery.

In an implementation form, the patent application relates to sparse signal detection, especially aspects of its performance quality.

In an implementation form, the patent application relates to a method for recovery of sparse signal combining OMP with one or several $l_1$ improvement steps comprising, performing OMP, computation of solution of the problem (DLP) according to equations (2), (3), checking residuals (4), (5), making improvement (6), (7), and keeping the record solution.

In an implementation form, the record solution is the best in terms of the cardinality.

In an implementation form, the record solution is the best in terms of the $l_1$ criterion value.

In an implementation form, the termination condition is feasibility of (DLP) (5).

In an implementation form, the termination condition is exhausting of the time allocated to the problem.

In an implementation form, the patent application allows for better performance if compared to OMP and/or LP.

In an implementation form, low rank matrix factorizations can be applied at each step of the algorithm to reduce the computational load.

In an implementation form, the patent application relates to a method for recovery of sparse signals combining advantages of OMP and LP approaches.

What is claimed is:
1. A method comprising:
   determining, by a communication device in a communication network, a support set indicating a set of first indices of non-zero communication signal coefficients from a channel matrix and a receive signal, the receive signal being a channel output version of a sparse communication signal, the channel matrix comprising an arrangement of channel coefficients of the channel;
   determining, by the communication device, an estimate of the sparse communication signal upon the basis of the support set, the channel matrix and the receive signal;

determining, by the communication device, second indices of communication signal coefficients which are not indicated by the support set, wherein determining the second indices of communication signal coefficients comprises minimizing a residual of a dual linear programming problem; and recovering, by the communication device, the sparse communication signal upon the basis of the support set, the estimate of the sparse communication signal, the second indices and the channel matrix.

2. The method according to claim 1, further comprising: updating, by the communication device, the support set upon the basis of the second indices of communication signal coefficients.

3. The method according to claim 2, further comprising: determining, by the communication device, a cardinality of the support set or the updated support set, the cardinality indicating a number of elements of the support set or the updated support set.

4. The method according to claim 1, wherein the sparse communication signal comprises communication signal coefficients and the receive signal comprises receive signal coefficients, and wherein the number of communication signal coefficients is greater than the number of receive signal coefficients.

5. The method according to claim 1, wherein determining the support set or determining the estimate of the sparse communication signal is performed by an orthogonal matching pursuit method.

6. The method according to claim 1, wherein the dual linear programming problem is defined by the following equations:

$$-e \leq H^T z \leq e,$$

$$y^T z \rightarrow \min,$$

wherein H denotes the channel matrix, y denotes the receive signal, e denotes an all unit vector, and z denotes a dual variable.

7. The method according to claim 1, wherein the residual is defined by:

$$\Delta_{S^*,j}^+ = 1 + H_j^T z_{S^*} \text{ or } \Delta_{S^*,j}^- = 1 - H_j^T z_{S^*}$$

with $z_{S^*} = -H_{S^*}(H_{S^*}^T H_{S^*})^{-1} e_{S^*}$, $$e_{S^*} = (e_{S^*,1}, e_{S^*,2}, \ldots, e_{S^*,I^*})^T,$$

$e_{S^*,i} = 1$ if $i \in S^*_+$, $e_{S^*,i} = -1$ if $i \in S^*_-$, and $$S^* = S^*_+ \cup S^*_-,$$

wherein S* denotes the support set being divided into two subsets according to signs of the entries of the vector $x_{S^*} = (H_{S^*}^T H_{S^*})^{-1} H_{S^*}^T y$, $S^*_+$ denotes a subset of the support set S* corresponding to the positive entries of $x_{S^*}$, $S^*_-$ denotes a subset of the support set S* corresponding to the negative entries of $x_{S^*}$, $e_{S^*}$ denotes an auxiliary vector, $e_{S^*,i}$ denote coefficients of the auxiliary vector $e_{S^*}$ with index i, $H_{S^*}$ denotes a channel matrix comprising columns indicated by the support set S*, $z_{S^*}$ denotes an estimate solution of a dual linear programming problem, $H_j$ denotes a channel matrix comprising a column indicated by index j, and $\Delta_{S^*,j}^+$ or $\Delta_{S^*,j}^-$ denote the residual.

8. The method according to claim 1, wherein the second indices of communication signal coefficients are determined according to the following equations:

$$j^{(1)} = \operatorname*{argmin}_j \Delta_{S^*,j}^+ \text{ or } j^{(1)} = \operatorname*{argmin}_j \Delta_{S^*,j}^-,$$

wherein $\Delta_{S^*,j}^+$ or $\Delta_{S^*,j}^-$ denote a residual of a dual linear programming problem, and $j^{(1)}$ denotes the second indices of communication signal coefficients.

9. The method according to claim 1, wherein recovering the sparse communication signal is performed according to the following equation:

$$x_S^{(1)} = x_{S^*} - \alpha (H_{S^*}^T H_{S^*})^{-1} H_{S^*}^T H_{j^{(1)}}, \alpha > 0$$

wherein $H_{S^*}$ denotes a channel matrix comprising columns indicated by the support set S*, $H_{j^{(1)}}$ denotes a channel matrix comprising columns indicated by second indices of communication signal coefficients $j^{(1)}$, α denotes a predetermined value, $x_{S^*}$ denotes an estimate of the sparse communication signal, and $x_S^{(1)}$ denotes the sparse communication signal.

10. The method according to claim 2, wherein updating the support set is performed according to the following equation:

$$S^{(1)} = S^* \cup \{j^{(1)}\} \setminus \{j_{i^{(1)}}\},$$

wherein $j^{(1)}$ denotes second indices of communication signal coefficients, $j_{i^{(1)}}$ denotes indices of communication signal coefficients to be removed from the support set, $i^{(1)}$ denotes a number of an entry to be removed from the support set, S* denotes the support set, and $S^{(1)}$ denotes the updated support set.

11. The method according to claim 3, wherein determining the support set, determining the estimate of the sparse communication signal, determining the second indices of communication signal coefficients, recovering the sparse communication signal, updating the support set, and determining the cardinality are successively repeated until a stopping criterion is met.

12. The method according to claim 11, wherein the sparse communication signal corresponding to the support set with least cardinality is provided as a recovered sparse communication signal.

13. The method according to claim 11, wherein the stopping criterion is a positive value or a zero value of all residuals of a dual linear programming problem, and wherein a residual is defined by:

$$\Delta_{S^*,j}^+ = 1 + H_j^T z_{S^*} \text{ or } \Delta_{S^*,j}^- = 1 - H_j^T z_{S^*}$$

with $z_{S^*} = -H_{S^*}(H_{S^*}^T H_{S^*})^{-1} e_{S^*}$, $$e_{S^*} = (e_{S^*,1}, e_{S^*,2}, \ldots, e_{S^*,I^*})^T,$$

$e_{S^*,i} = 1$ if $i \in S^*_+$, $e_{S^*,i} = -1$ if $i \in S^*_-$, and $$S^* = S^*_+ \cup S^*_-,$$

wherein S* denotes the support set being divided into two subsets according to signs of the entries of the vector $x_{S^*} = (H_{S^*}^T H_{S^*})^{-1} H_{S^*}^T y$, $S^*_+$ denotes a subset of the support set S* corresponding to the positive entries of $x_{S^*}$, $S^*_-$ denotes a subset of the support set S* corresponding to the negative entries of $x_{S^*}$, $e_{S^*}$ denotes an auxiliary vector, $e_{S^*,i}$ denote coefficients of the auxiliary vector $e_{S^*}$ with index i, $H_{S^*}$ denotes a channel matrix comprising columns indicated by the support set $S^*$, $z_{S^*}$ denotes an estimate solution of a dual linear programming problem, $H_j$ denotes a channel matrix comprising a column indicated by index j, and $\Delta_{S^*,j}^{+}$ or $\Delta_{S^*,j}^{-}$ denote the residual.

14. The method according to claim 11, wherein the stopping criterion is an expiry of a length of a predetermined time interval.

15. The method according to claim 2, further comprising: determining a cardinality of the support set or the updated support set, the cardinality indicating a number of elements of the support set or the updated support set.

16. The method according to claim 2, wherein the sparse communication signal comprises communication signal coefficients and the receive signal comprises receive signal coefficients, and wherein the number of communication signal coefficients is greater than the number of receive signal coefficients.

17. The method according to claim 2, wherein the dual linear programming problem is defined by the following equations:

$$-e \leq H^T z \leq e,$$

$$y^T z \to \min,$$

wherein H denotes the channel matrix, y denotes the receive signal, e denotes an all unit vector, and z denotes a dual variable.

18. The method according to claim 1, wherein the residual is defined by:

$$\Delta_{S^*,j}^{+} = 1 + H_j^T z_{S^*} \text{ or } \Delta_{S^*,j}^{-} = 1 - H_j^T z_{S^*}$$

with $z_{S^*} = -H_{S^*}(H_{S^*}^T H_{S^*})^{-1} e_{S^*}$, $e_{S^*} = (e_{S^*,1}, e_{S^*,2}, \ldots, e_{S^*,1^*})^T$, $e_{S^*,i} = 1$ if $i \in S^*_+$, $e_{S^*,i} = -1$ if $i \in S^*_-$, and $S^* = S^*_+ \cup S^*_-,$ wherein $S^*$ denotes the support set being divided into two subsets according to signs of the entries of the vector $x_{S^*} = (H_{S^*}^T H_{S^*})^{-1} H_{S^*}^T y$, $S^*_+$ denotes a subset of the support set $S^*$ corresponding to the positive entries of $x_{S^*}$, $S^*_-$ denotes a subset of the support set $S^*$ corresponding to the negative entries of $x_{S^*}$, $e_{S^*}$ denotes an auxiliary vector, $e_{S^*,i}$ denote coefficients of the auxiliary vector $e_{S^*}$ with index i, $H_{S^*}$ denotes a channel matrix comprising columns indicated by the support set $S^*$, $z_{S^*}$ denotes an estimate solution of a dual linear programming problem, $H_j$ denotes a channel matrix comprising a column indicated by index j, and $\Delta_{S^*,j}^{+}$ or $\Delta_{S^*,j}^{-}$ denote the residual.

19. The method according to claim 2, wherein the second indices of communication signal coefficients are determined according to the following equations:

$$j^{(1)} = \operatorname*{argmin}_j \Delta_{S^*,j}^{+} \text{ or } j^{(1)} = \operatorname*{argmin}_j \Delta_{S^*,j}^{-},$$

wherein $\Delta_{S^*,j}^{+}$ or $\Delta_{S^*,j}^{-}$ denote a residual of a dual linear programming problem, and $j^{(1)}$ denotes the second indices of communication signal coefficients.

20. The method according to claim 2, wherein recovering the sparse communication signal is performed according to the following equation:

$$x_{S^{(1)}} = x_{S^*} - \alpha (H_{S^*}^T H_{S^*})^{-1} H_{S^*}^T H_{j^{(1)}}, \alpha > 0$$

wherein $H_{S^*}$ denotes a channel matrix comprising columns indicated by the support set $S^*$, $H_{j^{(1)}}$ denotes a channel matrix comprising columns indicated by second indices of communication signal coefficients $j^{(1)}$, $\alpha$ denotes a predetermined value, $x_{S^*}$ denotes an estimate of the sparse communication signal, and $x_{S^{(1)}}$ denotes the sparse communication signal.

21. A non-transitory computer readable medium containing instructions that, when executed by at least one processor of a communication device in a communication network, cause the at least one processor to:
  determine a support set indicating a set of first indices of non-zero communication signal coefficients from a channel matrix and a receive signal, the receive signal being a channel output version of a sparse communication signal, the channel matrix comprising an arrangement of channel coefficients of the channel;
  determine an estimate of the sparse communication signal upon the basis of the support set, the channel matrix and the receive signal;
  determine second indices of communication signal coefficients which are not indicated by the support set, wherein determining the second indices of communication signal coefficients comprises minimizing a residual of a dual linear programming problem; and
  recover the sparse communication signal upon the basis of the support set, the estimate of the sparse communication signal, the second indices and the channel matrix.

* * * * *